(12) United States Patent
Kotvis et al.

(10) Patent No.: US 12,519,767 B2
(45) Date of Patent: Jan. 6, 2026

(54) AUTHENTICATION FOR INTERMITTENTLY CONNECTED NETWORKS

(71) Applicant: Insight Direct USA, Inc., Chandler, AZ (US)

(72) Inventors: Benjamin Kotvis, Sussex, WI (US); Marc Brumfield, Lemont, IL (US)

(73) Assignee: Insight Direct USA, Inc., Chandler, AZ (US)

( * ) Notice: Subject to any disclaimer, the term of this patent is extended or adjusted under 35 U.S.C. 154(b) by 50 days.

(21) Appl. No.: 18/680,098

(22) Filed: May 31, 2024

(65) Prior Publication Data

US 2025/0373590 A1 Dec. 4, 2025

(51) Int. Cl.
*H04L 9/40* (2022.01)

(52) U.S. Cl.
CPC .................. *H04L 63/08* (2013.01)

(58) Field of Classification Search
CPC ....................................... H04L 63/08
See application file for complete search history.

(56) References Cited

U.S. PATENT DOCUMENTS

| | | | |
|---|---|---|---|
| 9,736,169 B2 | 8/2017 | Addala et al. | |
| 10,140,443 B2 | 11/2018 | Movsisyan et al. | |
| 11,032,252 B2 | 6/2021 | Nielson et al. | |
| 11,172,366 B2 | 11/2021 | Ranjan et al. | |
| 11,343,247 B1 | 5/2022 | Ozarkar et al. | |
| 11,469,894 B2 | 10/2022 | Momchilov et al. | |
| 11,474,840 B1 | 10/2022 | Momchilov et al. | |
| 11,659,392 B2 | 5/2023 | Avetisov et al. | |
| 11,671,825 B2 | 6/2023 | Jones et al. | |
| 11,706,205 B2 | 7/2023 | Feijoo et al. | |
| 11,720,660 B2 | 8/2023 | Bowness et al. | |
| 2020/0153623 A1 | 5/2020 | Asanghanwa et al. | |
| 2022/0007190 A1 | 1/2022 | Holt et al. | |
| 2022/0012310 A1 | 1/2022 | Yan | |
| 2022/0014517 A1 | 1/2022 | Jain et al. | |
| 2022/0399996 A1 | 12/2022 | Desvignes et al. | |

(Continued)

FOREIGN PATENT DOCUMENTS

| CN | 114944928 A | 8/2022 |
|---|---|---|
| EP | 1905191 B1 | 9/2014 |

(Continued)

*Primary Examiner* — Benjamin A Kaplan
(74) *Attorney, Agent, or Firm* — Kinney & Lange, P.A.

(57) ABSTRACT

A network device includes a processor and computer-readable memory encoded with instructions. The network device is for use in a system that includes a local server on a local network and including a local IdP, and one or more identities stored on the local network and accessible by the local IdP. The network device is connected to an external network and to the local server. The instructions cause the network device to monitor a connection between the network device and the external network, determine a status of the connection, and detect an interruption in the connection. The instructions further cause the network device to determine whether the status of the connection complies with an offline authentication rule and communicate an indication of compliance with the offline authentication rule to the local IdP via an application program running on the local network to initiate offline authentication of a user.

20 Claims, 4 Drawing Sheets

(56) References Cited

U.S. PATENT DOCUMENTS

| | | | |
|---|---|---|---|
| 2023/0020656 A1 | 1/2023 | Momchilov et al. | |
| 2023/0143554 A1 | 5/2023 | Rahman | |
| 2023/0216693 A1 | 7/2023 | Singh et al. | |
| 2023/0229750 A1* | 7/2023 | Weiner | G06F 21/32 726/17 |
| 2023/0315830 A1* | 10/2023 | Mittal | G06F 9/547 726/21 |
| 2024/0004981 A1* | 1/2024 | Badri | G06F 21/33 |

FOREIGN PATENT DOCUMENTS

| | | |
|---|---|---|
| IN | 201911043604 A | 4/2021 |
| WO | 2007012083 A2 | 1/2007 |
| WO | 2020226884 A1 | 11/2020 |
| WO | 2021067434 A1 | 4/2021 |
| WO | 2021067510 A1 | 4/2021 |
| WO | 2022175329 A1 | 8/2022 |
| WO | 2023041634 A1 | 3/2023 |
| WO | 2023072668 A1 | 5/2023 |
| WO | 2023073166 A1 | 5/2023 |

* cited by examiner

AUTHENTICATION FOR INTERMITTENTLY CONNECTED NETWORKS

FIELD OF THE INVENTION

The present disclosure relates generally to user authentication and, more specifically, to systems and methods for user authentication in intermittently connected networks.

BACKGROUND

Before a user can access or interact with a network or computing resource, such as a mobile or web-based application, that resource will typically require user authentication to prevent unauthorized users from accessing sensitive information. A user can prove who they are (i.e., authenticate) by providing valid credentials. Identity providers (IdPs) manage identity information and offer user authentication as a service to relying parties. Identities can also be federated to other identity providers, which may mean that user authentication requires access to an external network, such as the Internet.

SUMMARY

In one example, a network device includes a processor and computer-readable memory encoded with instructions. The network device is for use in a system that includes a local server on a local network, the local server including a local identity provider to which an application program running on the local network connects for authenticating a user, and one or more identities stored on the local network and accessible by the local identity provider. The network device is connected to an external network and to the local server on the local network. The instructions, when executed by the processor, cause the network device to monitor a connection between the network device and the external network, determine a status of the connection between the network device and the external network, and detect an interruption in the connection between the network device and the external network. The instructions further cause the network device to determine, in response to detecting the interruption, whether the status of the connection complies with an offline authentication rule and communicate, in response to determining that the status of the connection complies with the offline authentication rule, an indication of compliance with the offline authentication rule to the local identity provider via the application program to initiate offline authentication of the user based on the one or more identities.

In another example, a method for authentication includes monitoring, by a network device, a connection between the network device and an external network, the network device being further connected to a local server on a local network and the local server including a local identity provider to which an application program running on the local network connects for authenticating a user. The method further includes determining, by the network device, a status of the connection between the network device and the external network and detecting, by the network device, an interruption in the connection between the network device and the external network. The method further includes determining, by the network device in response to detecting the interruption, whether the status of the connection complies with an offline authentication rule and communicating, by the network device in response to determining that the status of the connection complies with the offline authentication rule, an indication of compliance with the offline authentication rule to the local identity provider on the local server via the application program to initiate offline authentication of the user based on one or more identities stored on the local network and accessible by the local identity provider.

DETAILED DESCRIPTION

Devices connected to a local network often access resources hosted by servers and other devices connected to an external network. Interruptions to the connection between the local network and the outside network can disrupt functions of devices connected to the local network that are dependent on resources hosted on the outside network. Specifically, intermittent connectivity between a local and external network can disrupt an authentication attempt for an application running on the local network if the application relies on an externally hosted IdP, which leaves users unable to interact with the application. A network device and corresponding systems and methods according to techniques of this disclosure can analyze a connection status against predefined authentication rules to select between online and offline authentication paradigms. Local network-based offline authentication can then be used such that local network users can still be authenticated when there is an interruption in the connection between the local and external networks. Devices, systems and methods according to techniques of this disclosure will be described below with reference to FIGS. 1-4.

Figure 1:
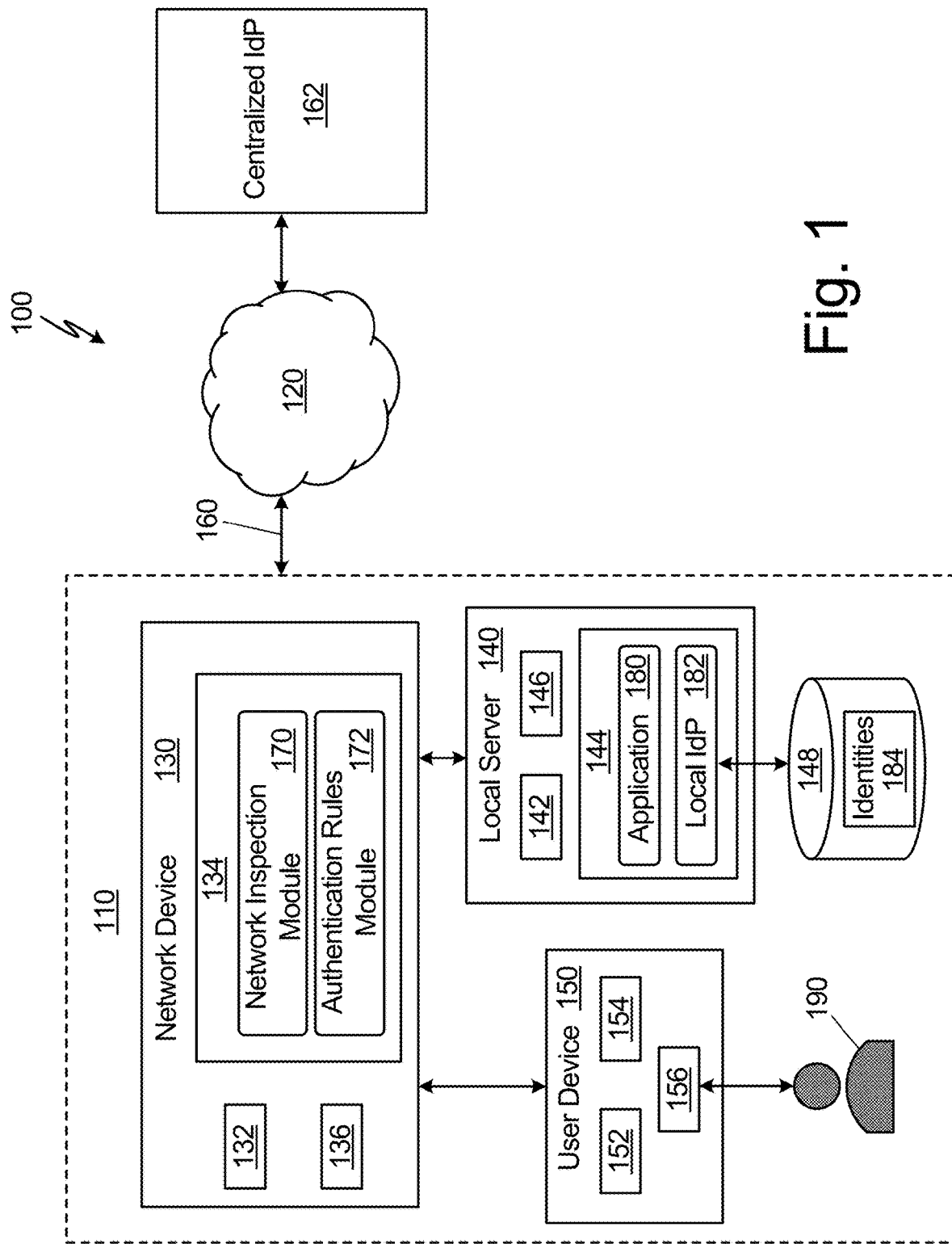
FIG. 1 is a schematic block diagram showing a first example of a system for authentication in an intermittently connected network.

FIG. 1 is a schematic block diagram showing system 100, which is an example of a system for authentication in an intermittently connected network. FIG. 1 shows system 100, local network 110, and external network 120. System 100 includes network device 130 (including processor 132, memory 134, and user interface 136), local server 140 (including processor 142, memory 144, and user interface 146), data store 148, and user device 150 (including processor 152, memory 154, and user interface 156) on local network 110. FIG. 1 shows communication link 160 between network device 130 and external network 120. FIG. 1 also shows centralized identity provider (IdP) 162 connected to external network 120. As shown in FIG. 1, network device 130 further includes network inspection module 170 and authentication rules module 172, local server 140 further includes application 180 and local IdP 182, and data store 148 includes identities 184. FIG. 1 also shows user 190.

System 100 utilizes local network 110. As shown in FIG. 1, some components of system 100 reside on, or are part of, local network 110 (e.g., network device 130, local server 140, and user device 150). Local network 110 can be, for example, a local area network (LAN), a building area network, a campus area network, or another suitable network type. Generally, local network 110 connects local devices (e.g., network device 130, local server 140, and user device 150) that are separated by smaller geographic distances than the devices of external network 120. Local network 110 can include any suitable combination of hardware devices such as, for example, one or more routers, switches, hubs, modems, bridges, and/or gateways, among other options. Local network 110 can be a wired or wireless network and can include one or more switches, routers, gateways, or other suitable network infrastructure. In some examples, local network 110 can include one or more devices interposed between user device 150 and network device 130 and/or between network device 130 and external network 120. In other examples, user device 150 is directly connected to network device 130 and network device 130 is directly connected to external network 120.

System 100 can also utilize external network 120. External network 120 is a network suitable for connecting servers and other computing devices that are separated by greater geographic distances than the devices of local network 110 (e.g., remote, or cloud-based, resources, such as centralized IdP 162, as will be described in greater detail subsequently). External network 120 can include network infrastructure for connecting devices separated by larger geographic distances. External network 120 can be, for example, a wide area network (WAN). In at least some examples, external network 120 is the Internet. Communication link 160 is between network device and/or another component of local network 110 and external network 120.

Communication link 160 connects network device 130 and/or another component of local network 110 to external network 120, such that data transmissions between local network 110 and external network 120 occur via communication link 160. Communication link 160 can be a wired or wireless connection and connects network device 130 to external network 120. In at least some examples, communication link 160 is a satellite connection. In operation, communication link 160 can be interrupted or disrupted, such that network device 130 and/or other devices of local network 110 become disconnected from external network 120 and, thus, are unable to access external network 120 and send requests to resources on external network 120 (e.g., centralized IdP 162). When communication link 160 is interrupted or disrupted, local network 110 and any devices thereon, including network device 130 and local server 140, can be referred to as "offline" with respect to external network 120. In these examples, communication link 160 can be referred to as an "intermittent connection." The disruptions to communication link 160 are generally temporary but can persist for extended periods of time while repairs, maintenance, or other suitable steps are taken to restore communication link 160. For example, where communication link 160 is a wireless connection, poor signal quality can cause disruption of communication facilitated by communication link 160 between the devices of local network 110 and the devices of external network 120. As a further example, where communication link 160 is a wired connection, mechanical damage to communication link 160 can disrupt communication between the devices of local network 110 and the devices of external network 120. While communication link 160 is disrupted, network device 130 and other devices of local network 110 are not able to communicate with and transmit data to resources connected to external network 120.

Network device 130 is an electronic device on local network 110. Network device 130 is communicatively coupled to user device 150 to receive data from and/or transmit data to user device 150. More specifically, network device 130 is positioned in local network 110 such that all data transmissions to and from user device 150 pass through network device 130. For example, network device 130 can be positioned at the edge of local network 110. That is, in some examples, network device 130 is an edge device of local network 110. Network device 130 is connected to external network 120 (either directly or through another component of local network 110) by communication link 160. Although FIG. 1 depicts only one network device 130, in some examples, multiple network devices 130 can be positioned at various choke or funnel points between local network 110 and external network 120. Network device 130 can be a custom device incorporated at a funnel or chokepoint at an edge location between devices of local network 110 and communication link 160 (e.g., at an edge of an existing local network 110). Additionally or alternatively, network device 130 can be created by providing an existing network edge device with network inspection module 170 and authentication rules module 172, for example, without additional hardware modification of the existing network edge device. The existing network edge device can be, for example, a router, a switch, or a gateway, among other options.

Network device 130 is also communicatively coupled to local server 140 on local network 110 to receive data from and/or transmit data to local server 140. Network device 130 is part of the infrastructure of local network 110 situated between user device 150 and local server 140. Generally, network traffic on local network 110 passes through network device 130. For example, user 190 using user device 150 can attempt to access an application (e.g., application 180, as will be described in greater detail subsequently) running on local server 140 by sending a request through network device 130. The request is communicated from user device 150 through network device 130 to local server 140 on local network 110. Requests to a destination on external network 120 (e.g., centralized IdP 162) from user device 150, local server 140, or other devices on local network 110 can also pass through network device 130 to external network 120. As will be explained in greater detail subsequently, network device 130 is capable of monitoring communication link 160 between network device 130 and external network 120 to determine the status of communication link 160. Network device 130 is also capable of determining if the status of communication link 160 complies with one or more authentication rules.

Processor 132 can execute software, applications, and/or programs stored on memory 134. Examples of processor 132 can include one or more of a processor, a microprocessor, a controller, a digital signal processor (DSP), an application specific integrated circuit (ASIC), a field-programmable gate array (FPGA), or other equivalent discrete or integrated logic circuitry. Processor 132 can be entirely or partially mounted on one or more circuit boards.

Network device includes memory 134. Memory 134 is configured to store information and, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 134 can be entirely or partly temporary memory, meaning that a primary purpose of memory 134 is not long-term storage. Memory 134, in some examples, is described as volatile memory, meaning that memory 134 does not maintain stored contents when power to memory 134 is turned off. Examples of volatile memories can include random access memories (RAM), dynamic random access memories (DRAM), static random access memories (SRAM), and other forms of volatile memories.

Memory 134, in some examples, also includes one or more computer-readable storage media. Memory 134 can be configured to store larger amounts of information than volatile memory. Memory 134 can further be configured for long-term storage of information. In some examples, memory 134 includes non-volatile storage elements. Examples of such non-volatile storage elements include, for example, magnetic hard discs, optical discs, flash memories, or forms of electrically programmable memories (EPROM) or electrically erasable and programmable memories (EEPROM).

In some examples, memory 134 is encoded with, or used to store, program instructions for execution by processor 132. In some examples, memory 134 is used by software or applications running on network device 130 to temporarily store information during program execution. Memory 134 can be configured to store information before, during, and/or after operation of network device 130 in system 100.

Network device 130 optionally includes user interface 136. User interface 136 is an input and/or output device and enables an operator to control operation of network device 130. User interface 136 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines. In some examples, network device 130 does not include a user interface and can be configured and/or operated using, for example, another device connected to network device 130, such as user device 150 or another component of local network 110.

Local server 140 is another electronic device on local network 110. Local server 140 can store data and/or perform compute tasks. Although local server 140 is generally referred to herein as a server, local server 140 can be any suitable computing device for storing data and/or performing compute tasks. More specifically, local server 140 runs application 180 and local IdP 182, as will be described in greater detail subsequently. Local server 140 is illustrated as a single device in FIG. 1, but other examples can include processing and memory distributed across multiple devices on local network 110. That is, in some examples, application 180 and local IdP 182 can run on the same device, and, in other examples, application 180 and local IdP 182 can run on different devices. As illustrated in FIG. 1, local server 140 includes processor 142 and memory 144, which are substantially similar to processor 132 and memory 134, respectively. Local server 140 can also optionally include user interface 146, which is substantially similar to user interface 136. In some examples, local server 140 does not include a user interface and can be configured and/or operated using, for example, another device connected to local server 140, such as network device 130, user device 150, or another component of local network 110.

User device 150 is an electronic device connected to network device 130. User device 150 can be, for example, a computer, such as a personal computer or a laptop computer, a tablet, or a mobile phone, among other options. User device 150 includes networking capability such that user device 150 can connect to network device 130 and/or another component of local network 110 that is in communication with network device 130. User device 150 can be connected via a wireless and/or wired connection to network device 130 and/or local network 110. User device 150 can be directly connected to network device 130 and/or can be connected to network device 130 via one or more interposed components of network 110. In examples where user device 150 is directly connected to network device 130, user device 150 can send data directly to and receive data directly from network device 130. In examples where user device 150 is connected to network device 130 via one or more interposed components of local network 110 (e.g., one or more routers, switches, gateways, etc.), user device 150 can send data to and receive data from network device 130 through the intervening components. User device 150 includes processor 152 and memory 154, which are substantially similar to processor 132 and memory 134, respectively. User device 150 also includes user interface 156, which is substantially similar to user interface 136. User 190 can attempt to access application 180 (or any other application on local network 110 or accessible from external network 120) by interacting with user interface 156 of user device 150 to send a request through network device 130 to local server 140 or to external network 120.

Application 180 is a mobile or web-based application program that is stored and run locally on local server 140 (or proxied to run locally on local server 140). Application 180 can be stored in memory 144 and executed by processor 142 of local server 140. Generally, application 180 can be any mobile or web-based application. In one specific implementation, application 180 can be the OpenShift Container Platform developed by Red Hat Software. User 190 may access application 180 by sending a request from user device 150 through network device 130 to local server 140. For user 190 to access and interact with application 180, application 180 can require user 190 to be authenticated. Application 180 is configured to connect to local IdP 182 to authenticate user 190. For example, application 180 can be configured with an address for local IdP 182 such that application 180 can connect to local IdP 182. When application 180 outsources user authentication to local IdP 182, application 180 can be considered a "relying party" application of local IdP 182.

Local IdP 182 is an IdP on local network 110 that runs on local server 140. Local IdP 182 provides user authentication as a service for relying party applications, such as application 180. In some examples, local IdP 182 can be a hosted component of an IdP framework or platform. In one specific implementation, local IdP 182 can be based on the open source IdentityServer framework. Local IdP 182 can implement a standard authentication protocol, such as using OpenID Connect (OIDC) or Security Assertion Markup Language (SAML). As described previously, application 180 can connect to local IdP 182 for authentication services. Although not depicted in FIG. 1, other applications on local network 110 can also connect to local IdP 182 for authentication services (i.e., there can be multiple relying party applications with respect to local IdP 182). In an authentication pipeline for application 180, local IdP 182 is the IdP that is situated nearest to application 180.

As illustrated in FIG. 1, local IdP 182 can be configured to connect to data store 148 for accessing stored identities 184. Local IdP 182 can be configured to use any suitable method of authentication, such as requiring a username and password or some other form of authentication, including multi-factor authentication (MFA). In some examples, local IdP 182 can be configured to delegate authentication services to another IdP. That is, local IdP 182 can utilize federated identity management (FIM). For example, local IdP 182 could be configured to redirect to another IdP (e.g., for certain relying party applications or under certain network conditions). Alternatively, local IdP 182 could be configured to allow users to select a desired IdP. In some examples, local IdP 182 can redirect to centralized IdP 162, as will be described in greater detail subsequently. In such examples, user credentials are not directly accessible by local IdP 182 but are instead maintained by the other IdP. Upon successful authentication, local IdP 182 returns the authenticated identity to the relying party application, such as in the form of an encrypted token or the like, and the relying party application handles permissions or authorizations corresponding to that identity.

Data store 148 is a physical or virtual data storage element associated with local server 140 that is configured to store identities 184. In FIG. 1, data store 148 is illustrated schematically as a separate data store that is coupled to local server 140. For example, data store 148 can be a network-accessible database for storing identities 184. In some examples, data store 148 can include local (e.g., on-premises) storage. In other examples, data store 148 can include remote storage, such as cloud-based storage. In yet other examples, data store 148 can instead include storage that is part of a same device as other components of local server 140. In some such examples, memory 144 of local server 140 can include multiple memory devices and identities 184 can be stored on a hardware memory device of local server 140 that is different than the memory device that stores application 180, local IdP 182, or other software components of local server 140. Additionally and/or alternatively, identities 184 can be stored to a partition and/or volume of a memory device (e.g., memory 144) that also stores application 180, local IdP 182, and/or other software components of local server 140.

Data store 148 includes machine-readable data storage capable of retrievably housing stored data (e.g., identities 184). In some examples, data store 148 includes long-term non-volatile storage media, such as magnetic hard discs, optical discs, flash memories and other forms of solid-state memory, or forms of electrically programmable memories (EPROM) or electrically erasable and programmable (EEPROM) memories. Data store 148 can organize data using a relational database management system (RDBMS), object-relational database management system (ORDBMS), columnar database management systems (CDBMS), document-oriented database management systems (DoDBMS) and/or a multi-model database management system (MMDBMS). Local server 140 (and/or other devices of local network 110) can query data store 148 to retrieve data and further can store and/or back up data to data store 148.

Identities 184 are stored identity information for one or more users on local network 110. That is, identities 184 include one or more stored identities of one or more users, which can be used for authenticating users on local network 110. Identities 184 can take the form of any suitable data structure suitable for storing information in an organized manner for later retrieval, such as a table or linked list, among other options. Identities 184 can include local credentials (i.e., for use during offline authentication, as will be described in greater detail subsequently), such as a personal identification number (PIN) or information associated with a hardware module, such as a Universal Serial Bus (USB) dongle, a Common Access Card (CAC), etc. Local credentials serve as backup credentials when communication link 160 is interrupted and devices of local network 110 are offline with respect to external network 120. That is, as will be described in greater detail subsequently, local credentials of identities 184 can be relied upon during offline authentication paradigms. In some examples, identities 184 can include one or more PINs that are each associated with a stored identity and shared with a corresponding user. In one example, a subset of identities 184 is associated with corresponding PINs (i.e., some of identities 184 are not associated with corresponding PINs). In some examples, identities 184 include one or more federated identities associated with an indication that credentials reside elsewhere with another IdP that was previously used to authenticate, such as centralized IdP 162. In some such examples, an indication of the base registry of the one or more federated identities can be pushed down or synchronized to data store 148 from centralized IdP 162 (e.g., periodically or continuously when communication link 160 is available) and associated in data store 148 with any local credentials, if applicable.

Centralized IdP 162 is an IdP connected to external network 120 and accessible by devices of local network 110. Centralized IdP 162 is generally similar to local IdP 182, except that centralized IdP 162 is not part of local network 110. That is, centralized IdP 162 can run on an electronic device that is not directly connected to network device 130, local server 140, or user device 150, such that data transmissions directed to centralized IdP 162 are facilitated through the devices and systems of external network 120. Like local IdP 182, centralized IdP 162 provides user authentication as a service for relying party applications and can include any suitable authentication protocols and methods. In some examples, centralized IdP 162 is a centralized IdP for an organization and may store and manage all user identities for the organization in a centralized manner. Centralized IdP 162 can, for example, include directory services, such as Lightweight Directory Access Protocol (LDAP) implementations or other options, including Active Directory (available from Microsoft), Oracle Internet Directory (available from Oracle), etc. As described previously with respect to local IdP 182 and identities 184, local IdP 182 can be federated to centralized IdP 162. In such examples, centralized IdP 162 can store credentials for one or more federated identities of identities 184. As will be described in greater detail subsequently, centralized IdP 162 can be relied upon as the primary user authentication service for online authentication paradigms.

The functionality of network device 130 can be further defined as a set of functional modules. Although the functionality of network device 130 is described with respect to FIG. 1 as being divided into two modules, it should be understood that the functionality of network device 130 could also be described as more or fewer modules, which could depend, in some examples, on how software is written or organized. As illustrated in FIG. 1, network device 130 includes network inspection module 170 and authentication rules module 172. Network inspection module 170 and authentication rules module 172 will generally be described sequentially herein; however, these modules need not always be performed in any particular order and may also include overlapping or interspersed functionality.

Network inspection module 170 is a first functional module of network device 130. In one example, network inspection module 170 is a software module encoded in memory 134 and executed by processor 132 of network device 130. Network inspection module 170 includes one or more programs for monitoring communication link 160 to determine the status of communication link 160. Network inspection module 170 can monitor and inspect the status of communication link 160 by, for example, sending a test communication to a device connected to external network 120 that is configured to elicit a response from the external network-connected device. The presence or absence of a received response to the test communication can be used to determine the status of communication link 160. That is, if a response is received, then network inspection module 170 detects that communication link 160 is available or has been restored. If no response is received, then network inspection module 170 detects an interruption in communication link 160 (i.e., that communication link 160 is disconnected or offline). As a further example, network inspection module 170 can cause processor 132 to send a request to another element of local network 110 to determine the status of communication link 160. For example, network inspection module 170 can be configured to send a request to a router or another network device on local network 110 to determine whether communication link 160 is available. In other examples, network inspection module 170 can use another suitable method of determining the status of communication link 160.

As described, network inspection module 170 can determine the status of communication link 160 and detect if communication link 160 is available or if there is an interruption in communication link 160. More specifically, in some examples, network inspection module 170 can be configured to track and calculate a duration of the interruption in communication link 160 (e.g., how many seconds, minutes, hours, or other increments of time communication link 160 has been disconnected or offline). Additionally or alternatively, network inspection module 170 can be configured to determine a time of day of the interruption in communication link 160. For example, network inspection module 170 can be configured to record an initial time of day when the interruption in communication link 160 is first detected. In some examples, network inspection module 170 can also be configured to determine average times of day over multiple days when interruptions in communication link 160 are detected. Network inspection module 170 can also be configured to track or determine any suitable aspects of communication link 160 that are useful for characterizing an interruption or pattern of interruptions in communication link 160.

Authentication rules module 172 is a second functional module of network device 130. In one example, authentication rules module 172 is a software module encoded in memory 134 and executed by processor 132 of network device 130. Authentication rules module 172 includes one or more programs for determining whether the status of connection link 160 complies with one or more authentication rules and, thus, whether online or offline authentication should be performed. Authentication rules module 172 includes an authentication rules engine including one or more conditional authentication rules relating to the status of communication link 160 and the desired authentication paradigm. Network device 130 uses the authentication rules engine to determine whether the status of connection link 160 complies with one or more authentication rules and whether online or offline authentication should be performed based on compliance with the one or more authentication rules.

The authentication rules engine can include one or more online authentication rules and one or more offline authentication rules. The authentication rules engine can cause network device 130 to determine that online authentication should be performed based on compliance with an online authentication rule. Network device 130 can determine that the status of communication link 160 complies with an online authentication rule in response to network inspection module 170 detecting communication link 160 is available or restored, among other options. For example, an online authentication rule can be a binary (true/false) rule for permitting online authentication when communication link 160 is available. On the other hand, the authentication rules engine can cause network device 130 to determine that offline authentication should be performed based on compliance with an offline authentication rule. Network device 130 can determine that the status of communication link 160 complies with an offline authentication rule in response to network inspection module 170 detecting an interruption in communication link 160 (i.e., that communication link 160 is disconnected or offline), among other options.

In some examples, offline authentication rules can include more specific conditions. For example, the offline authentication rules can include one or more conditions based on the duration of an interruption in communication link 160. In one such example, determining compliance with an offline authentication rule can include determining whether the duration of the interruption in communication link 160 is less than a threshold duration defined by the offline authentication rule. That is, network device 130 can determine that the status of communication link 160 complies with an offline authentication rule when the duration of the interruption in communication link 160 is less than the threshold duration. For example, the threshold duration could be two hours, five hours, eight hours, or other durations. In other examples, the offline authentication rules can include one or more conditions based on the time of day of an interruption in communication link 160. In one such example, determining compliance with an offline authentication rule can include determining whether the time of day of the interruption in communication link 160 corresponds to a permitted offline period defined by the offline authentication rule. That is, network device 130 can determine that the status of communication link 160 complies with an offline authentication rule when the time of day of the interruption in communication link 160 corresponds to the permitted offline period. For example, the permitted offline period could be between 8 AM and 5 PM local time on weekdays (Monday through Friday), or any other time period. In another such example, determining compliance with an offline authentication rule can include determining whether the time of day of the interruption in communication link 160 corresponds to a predetermined pattern of offline activity for the user who is attempting to authenticate. That is, network device 130 can determine that the status of communication link 160 complies with an offline authentication rule when the time of day of the interruption in communication link 160 corresponds to the predetermined pattern of offline activity for the user. For example, network device 130 can be configured to track offline activity for particular users, such as by calculating an average time of day or frequency at certain times of day, and define a permitted offline period based on that pattern of offline activity (e.g., by defining some range of time around the pattern of offline activity).

Other offline authentication rules are also possible, such as general rules relating to particular sites within an organization. For example, local network 110 may be at a relatively remote site where there is a higher likelihood of interruptions (and possibly more lengthy interruptions) to communication link 160, or local network 110 may be at a relatively more robust site where communication link 160 is expected to have a more consistent connection (i.e., is expected to be online). This information characterizing the expected connectivity at a particular site could be combined with rules based on the duration of interruptions to more specifically tailor the offline authentication rules to the site. For example, an offline authentication rule could set a maximum offline duration of two hours at a robust site and a maximum offline duration of eight hours at a more remote site. Generally, compared to online authentication rules, offline authentication rules can be more complex to accommodate various offline situations while maintaining security on local network 110. The authentication rules engine can also generally include conditional rules relating to any one or more aspects of communication link 160 and/or another element of system 100 that are useful for determining whether to perform online or offline authentication.

Upon determining whether the status of communication link 160 complies with one or more authentication rules, authentication rules module 172 can also cause network device 130 to communicate an indication of the determination to one or more downstream components of local network 110, such as to application 180 and local IdP 182 on local server 140. For example, in response to determining that the status of communication link 160 complies with an offline authentication rule, network device 130 can be configured to communicate an indication of compliance with the offline authentication rule. The indication of compliance with the offline authentication rule causes application 180 and local IdP 182 to carry out offline authentication. In another example, in response to determining that the status of communication link 160 complies with an online authentication rule, network device 130 can be configured to communicate an indication of compliance with the online authentication rule. The indication of compliance with the online authentication rule causes application 180 and local IdP 182 to carry out online authentication. In some examples, network device 130 can also be configured to communicate an indication of an error if the status of communication link 160 is not compliant with an offline authentication rule (and communication link 160 is not online) or if the status of communication link 160 is not compliant with an online authentication rule.

In an example implementation, user 190 attempts to access and interact with application 180 via user interface 156 on user device 150. A request to access application 180 is transmitted from user device 150, through network device 130, to local server 140 where application 180 resides (or is proxied). When network device 130 receives the request to access application 180 from user device 150, network device 130 will determine the status of communication link 160 and further determine whether the status of communication link 160 complies with one or more authentication rules. Network device 130 communicates one of an indication of compliance with an offline authentication rule, an indication of compliance with an online authentication rule, or an indication of an error to application 180 and/or local IdP 182 (e.g., via application 180). For example, the communicated indication can take the form of a Hypertext Transfer Protocol (HTTP) header or another indicator that is passed along with the request from network device 130 to downstream components on local network 110. Accordingly, application 180 and/or local IdP 182 are instructed based on the status of communication link 160 as determined by network device 130.

Upon receiving the request and indication from network device 130 on local server 140, application 180 can be configured to authenticate user 190 before allowing user 190 to access and interact with application 180. Application 180 is configured to connect to local IdP 182 to authenticate user 190. In some examples, application 180 can be configured to redirect to an organization-specific sign-in page that is displayed to user 190 via user interface 156. The sign-in page may be different to correspond to an online or offline authentication paradigm. In response to an indication of compliance with an offline authentication rule from network device 130, local IdP 182 is configured to initiate an offline authentication process. In an offline authentication process, local IdP 182 can be configured to access local credentials from identities 184 in data store 148 and generate a request for corresponding information from user 190, such as a username and PIN or other information. Local IdP 182 can then compare information from user 190 to stored identities 184 to determine if user 190 can be authenticated based on a local credential. In response to an indication of compliance with an online authentication rule from network device 130, local IdP 182 is configured to initiate an online authentication process. In an online authentication process, local IdP 182 can be configured for federation to centralized IdP 162. That is, local IdP 182 can communicate with centralized IdP 162 to determine if user 190 can be authenticated based on credentials that reside at centralized IdP 162. Moreover, local IdP 182 can be configured such that any offline authentication methods (e.g., using local credentials) are not permitted or are blocked when communication link 160 is available, such as whenever local IdP 182 receives an indication of compliance with an online authentication rule from network device 130.

Local IdP 182 communicates back to application 180 whether authentication is successful or not based on local credentials or based on federation to centralized IdP 162, depending on the indicated authentication paradigm. Application 180 merely reacts to the successful or failed authentication but does not necessarily behave differently based on the authentication paradigm used by local IdP 182. In some examples, when authentication is successful, local IdP 182 can generate some type of token with claims that define the authority for user 190 within application 180 and encrypt the token. User 190 will then be permitted to access and interact with application 180 according to the encrypted token received by application 180.

System 100 and network device 130 provide a number of advantages. Network device 130 allows for detecting the status of communication link 160 between local network 110 and external network 120 and applying rules for selecting an online or offline authentication paradigm without requiring the applications or other devices on local network 110 to be significantly modified or reconfigured to perform these actions. Further, as described previously, the position of network device 130 between user device 150 and external network 120 and local server 140 allows all outbound requests from user device 150 to be passively transmitted through (i.e., be received by) network device 130. That is, by positioning network device 130 at a funnel or bottleneck of local network 110, network device 130 can intercept requests from user device 150 to external network 120 or local server 140 without requiring user device 150 to be configured to specifically send data to network device 130. In this manner, network device 130 is advantageously able to automatically initiate online or offline authentication on behalf of devices on local network 110 that are not otherwise configured to do so. Network device 130 is thereby advantageously able to be incorporated into existing systems and does not require any significant modification of other devices of those existing systems to provide dynamic online and offline authentication capabilities, as described herein.

Existing methods of performing offline authentication require creation or modification of software in an application-by-application and/or device-by-device manner, particularly on the user device side. Accordingly, these existing methods are often labor-intensive and expensive to implement. Conversely, system 100 allows for network device 130 to automatically initiate online or offline authentication on behalf devices connected to network device 130 and/or local network 110, and thereby does not require any reconfiguration or modification of user device 150 or the applications or programs thereof to provide authentication logic.

Moreover, system 100 including network device 130 may be more secure than existing methods of performing offline authentication. For example, network traffic is funneled through separate network device 130, which may avoid vulnerabilities in systems where a local IdP is more directly accessible. Having local backup credentials accessible on local network 110 also avoids security concerns that arise with credential synchronization. Additionally, the authentication rules engine of network device 130 can be configured to facilitate offline authentication in only limited circumstances, such as based on finite offline periods, which may be more secure than permitting offline authentication in any offline circumstances.

Network device 130 confers advantages to network systems where communication link 160 is subject to relatively frequent disruption, such as where communication link 160 is a wireless connection (e.g., a cellular or satellite connection). For example, communication link 160 may be set up for a network system in a relatively remote facility where wired connections are not available, are difficult to implement, or are expensive to install. In these remote sites, connections to an external network are facilitated by a disruptable wireless connection. Network device 130 can be added to such a system to allow applications or systems that expect a continuous and/or persistent external network connection to be used with minimal or no reconfiguration. Network device 130 also provides the aforementioned advantages to systems connected to an external network via a wired connection. For example, a wired connection extending through a remote area may be subject to mechanical damage from weather, animals, etc. When the local network is offline (e.g., communication link 160 is disrupted), users may be unable to access resources connected to an external network, including centralized IdP 162, and the incorporation of network device 130 provides seamless access to a locally available alternative option for authentication. Without access to either an external network or a local option for authentication, a system might otherwise need to rely on a separate single-use backup password or a physical key, which may have security concerns. Thus, network device 130 facilitates a more secure alternative for authentication in systems with frequently disrupted connections to external networks.

For some legacy systems, it can be significantly time- and labor-intensive to upgrade systems of a local network 110 to detect the status of communication link 160 and select an alternative authentication paradigm when communication link 160 is interrupted or inoperable. Advantageously, network device 130 can detect the status of communication link 160 and apply rules for selecting authentication paradigms into legacy systems without requiring significant upgrading of those legacy systems.

Notably, network device 130 can automatically select or switch between an online and offline authentication paradigm when a request is received without creating any error messages or otherwise alerting user device 150 of the status of communication link 160, except in an instance where neither authentication option is permitted. Advantageously, this can reduce the incidence of errors that disrupt the operation of user device 150 and/or require intervention from a human operator to remedy. Further, user device 150 is not required to be configured to detect the status of communication link 160 when network device 130 is used, as network device 130 handles logic for switching to offline authentication when communication link 160 is unavailable.

Figure 2:
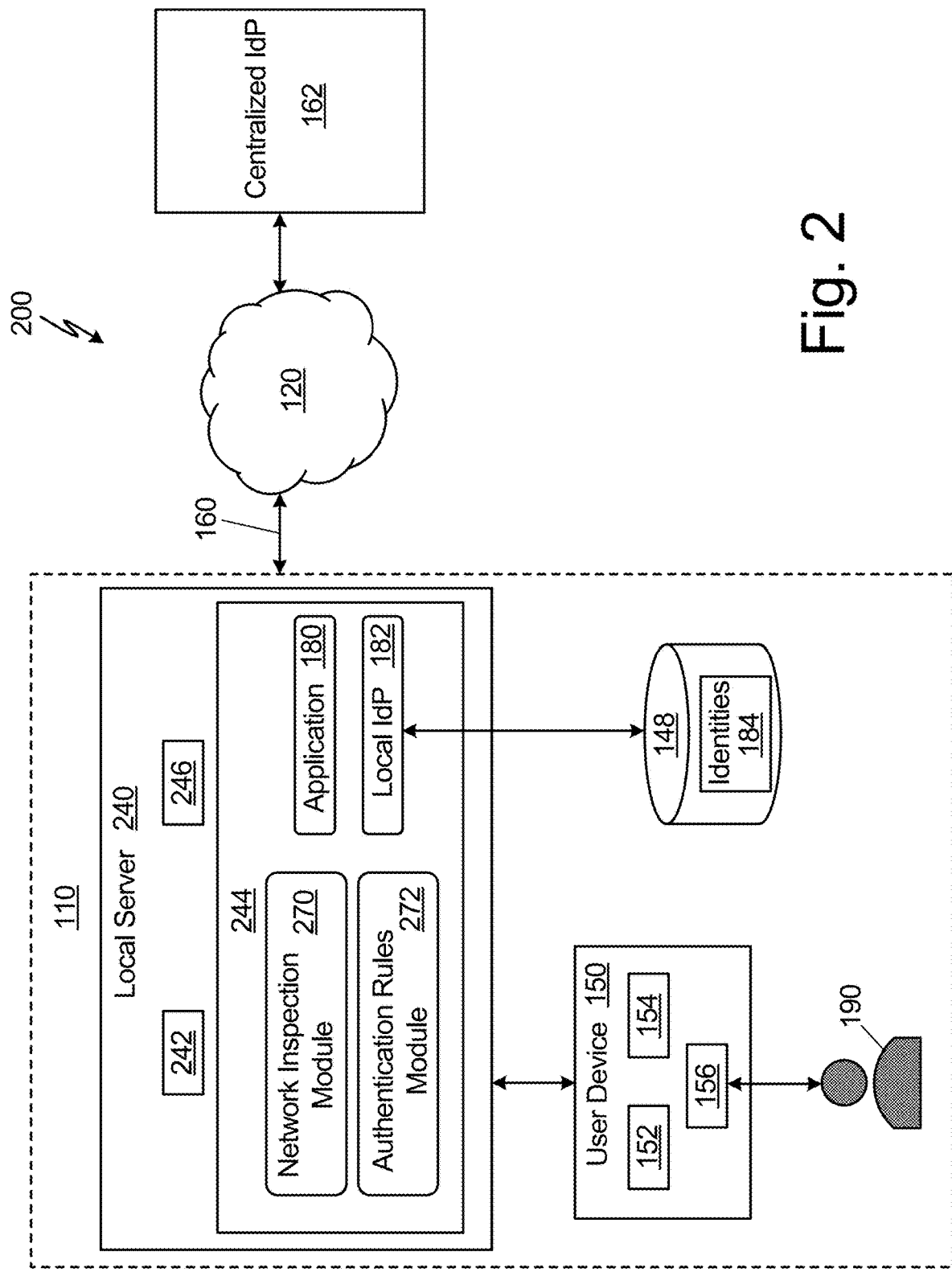
FIG. 2 is a schematic block diagram showing a second example of a system for authentication in an intermittently connected network.

FIG. 2 is a schematic block diagram showing system 200, which is another example of a system for authentication in an intermittently connected network. FIG. 2 shows system 200, local network 110, and external network 120. System 200 is similar to system 100 and includes user device 150 (including processor 152, memory 154, and user interface 156) and data store 148 (including identities 184) on local network 110. However, system 200 includes local server 240 (including processor 242, memory 244, and user interface 246) on local network 110, instead of network device 130 and local sever 140 (shown in FIG. 1). As shown in FIG. 2, local server 240 further includes network inspection module 270, which is similar to network inspection module 170 (shown in FIG. 1), authentication rules module 272, which is similar to authentication rules module 172 (shown in FIG. 1), application 180, and local IdP 182. FIG. 2 also shows communication link 160 between local server 240 and external network 120, centralized IdP 162 connected to external network 120, and user 190. For simplicity, some details of shared or similar parts between system 100 and system 200 will not be repeated in this section.

As shown in FIG. 2, each of network inspection module 270, authentication rules module 272, application 180, and local IdP 182 is included on local server 240. As such, there is no network device interposed between user device 150 and local server 240, and local server 240 effectively serves as both the network device and the local server of system 100 (shown in FIG. 1). That is, requests from user device 150 to an application of local server 240 are communicated directly to local server 240. Further, local server 240 can be directly connected to external network 120 via communication link 160 such that requests from user device 150 to an application connected to external network 120 are funneled through local server 240 rather than another device on local network 110.

System 200 generally retains the same advantages as system 100 for detecting the status of communication link 160 and incorporating rules for selecting authentication paradigms to accommodate intermittent network connectivity. However, system 200 including network inspection module 270, authentication rules module 272, application 180, and local IdP 182 on local server 240 avoids the need to add hardware into local network 110 and instead only adds software modules into an existing infrastructure, which may be relatively simpler to implement.

Figure 3:
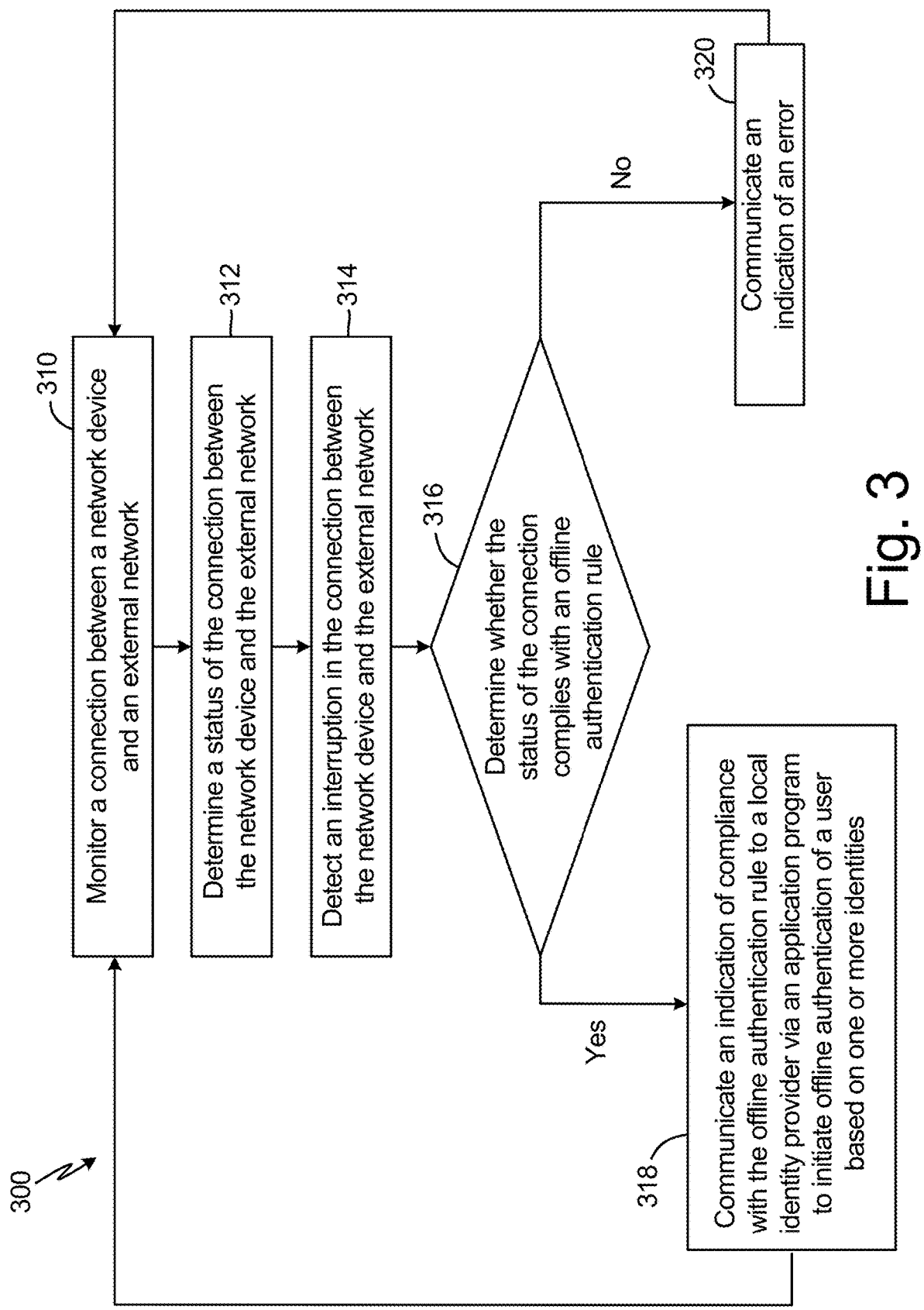
FIG. 3 is a process flow diagram showing steps of a process for authentication in an intermittently connected network when an external network connection is interrupted.
Figure 4:
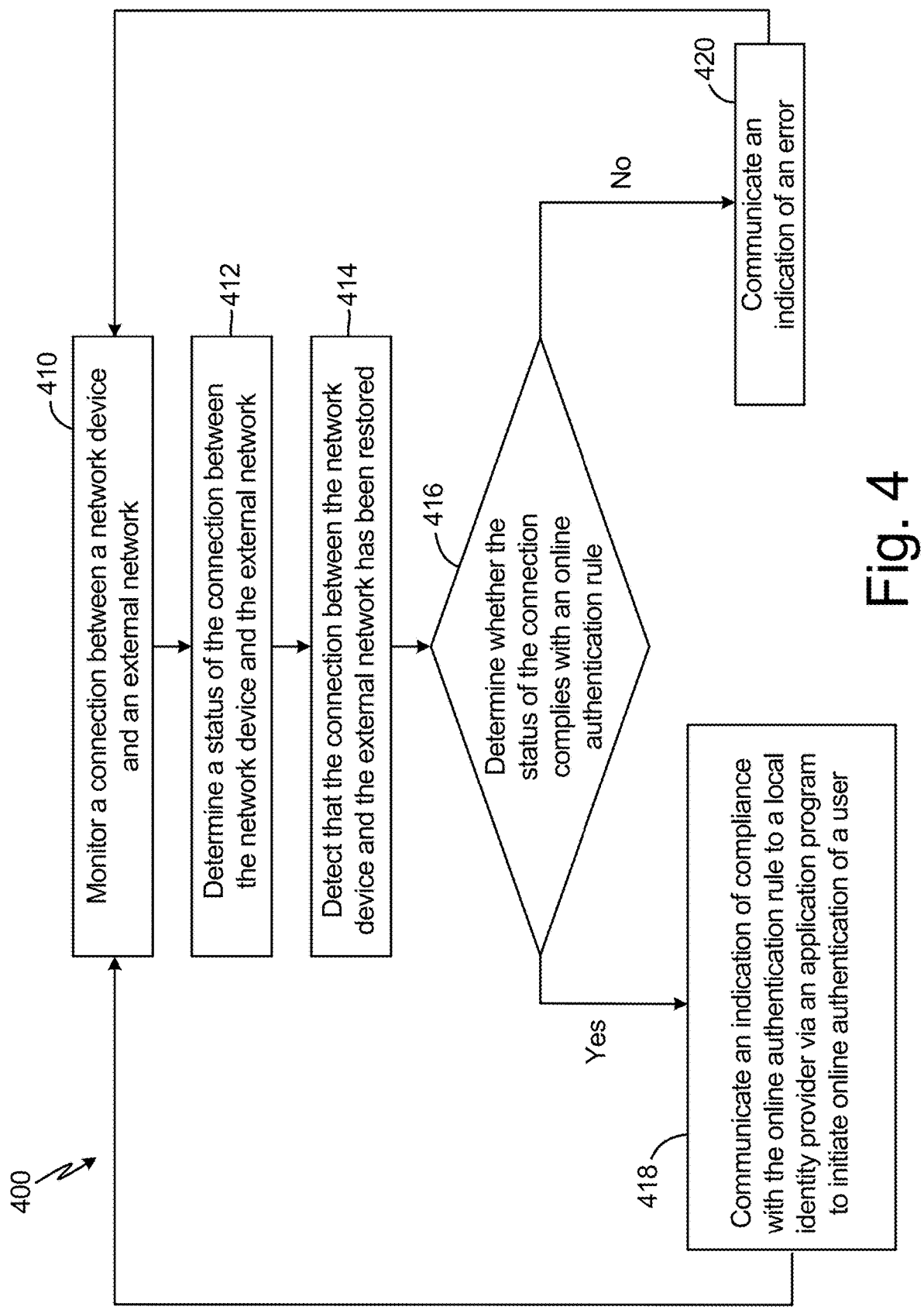
FIG. 4 is a process flow diagram showing steps of a process for authentication in an intermittently connected network when the external network connection is restored.

Processes associated with systems 100 and 200 are shown in FIGS. 3-4. For simplicity, the processes illustrated in FIGS. 3-4 will be described with reference to components of system 100 (shown in FIG. 1); however, it should be understood that the processes illustrated in FIGS. 3-4 are also applicable to system 200 (shown in FIG. 2).

FIG. 3 is a is a process flow diagram showing steps 310-320 of process 300 for authentication in an intermittently connected network when an external network connection is interrupted. As shown in FIG. 3, a first step of process 300 is monitoring a connection (communication link 160) between network device 130 and external network 120 (step 310). At step 312, network inspection module 170 determines a status of the connection between network device 130 and external network 120. At step 314, network inspection module 170 detects an interruption in the connection between network device 130 and external network 120. In some examples, network inspection module 170 further determines a duration of the interruption or a time of day of the interruption.

At decision 316, authentication rules module 172 determines whether the status of the connection complies with an offline authentication rule. In some examples, the offline authentication rule is based on the duration of the interruption or the time of day of the interruption. In some examples, authentication rules module 172 determines that the duration of the interruption is less than a threshold duration defined by the offline authentication rule. In some examples, authentication rules module 172 determines that the time of day of the interruption corresponds to a permitted offline period defined by the offline authentication rule. In some examples, authentication rules module 172 determines that the time of day of the interruption corresponds to a predetermined pattern of offline activity for a user. In response to determining that the status of the connection complies with an offline authentication rule ("Yes" in FIG. 3), network device 130 communicates an indication of compliance with the offline authentication rule to local IdP 182 via application 180 to initiate offline authentication of a user based on locally stored identities 184 (step 318). In some examples, the indication of compliance with the offline authentication rule is an HTTP header. In some examples, a subset of locally stored identities 184 is associated with corresponding PINs, and offline authentication includes presenting a request for a PIN from the user. In response to determining that the status of the connection does not comply with an offline authentication rule ("No" in FIG. 3), network device 130 communicates an indication of an error (step 320).

Either step 318 or step 320 can be a final step of process 300, or process 300 can return to step 310 (as illustrated by the arrows extending from steps 318 and 320). Further, although illustrated as single steps, it should be understood that each of steps 310-320 can, in other examples, be repeated any number of times in process 300.

FIG. 4 is a is a process flow diagram showing steps 410-420 of process 400 for authentication in an intermittently connected network when the external network connection is restored. As shown in FIG. 4, a first step of process 400 is monitoring a connection (communication link 160) between network device 130 and external network 120 (step 410). At step 412, network inspection module 170 determines a status of the connection between network device 130 and external network 120. Steps 410 and 412 of process 400 are the same as steps 310 and 312 of process 300 (FIG. 3). At step 414, network inspection module 170 detects that the connection between network device 130 and external network 120 has been restored.

At decision 416, authentication rules module 172 determines whether the status of the connection complies with an online authentication rule. In response to determining that the status of the connection complies with an online authentication rule ("Yes" in FIG. 4), network device 130 communicates an indication of compliance with the online authentication rule to local IdP 182 via application 180 to initiate online authentication of a user (step 418). In some examples, the online authentication is based on federation to centralized IdP 162, which is available via external network 120. In response to determining that the status of the connection does not comply with an online authentication rule ("No" in FIG. 4), network device 130 communicates an indication of an error (step 420).

Either step 418 or step 420 can be a final step of process 400, or process 400 can return to step 410 (as illustrated by the arrows extending from steps 418 and 420). Further, although illustrated as single steps, it should be understood that each of steps 410-420 can, in other examples, be repeated any number of times in process 400.

Referring to FIGS. 3-4 together, process 300 and process 400 can be repeated and/or performed continuously by network device 130 for all requests received by network device 130 that will trigger user authentication. Further, network device 130 can perform multiple instances of process 300 and/or process 400 simultaneously or substantially simultaneously, thereby allowing network device 130 to initiate online or offline authentication simultaneously or substantially simultaneously without introducing a substantial delay in the operation of user device 150 and other devices on local network 110.

Process 300 and process 400 are performed by a network device according to the present disclosure to provide dynamic online and offline authentication based on network connectivity conditions. The combination of process 300 and process 400 allows for seamless authentication during intermittent outages of a connection between a local network and an external network. Further, process 300 and process 400 allow for detecting network connection statuses and applying conditional authentication rules in a user-friendly and secure manner without requiring significant hardware or software modifications of devices or components connected to the local network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A network device for use in a system that includes a local server on a local network, the local server including a local identity provider to which an application program running on the local network connects for authenticating a user, and one or more identities stored on the local network and accessible by the local identity provider, the network device being connected to an external network and to the local server on the local network, the network device comprising:

a processor; and
  computer-readable memory encoded with instructions that, when executed by the processor, cause the network device to:
    monitor a connection between the network device and the external network;
    determine a status of the connection between the network device and the external network;
    detect an interruption in the connection between the network device and the external network;
    determine, in response to detecting the interruption, whether the status of the connection complies with an offline authentication rule; and communicate, in response to determining that the status of the connection complies with the offline authentication rule, an indication of compliance with the offline authentication rule to the local identity provider via the application program to initiate offline authentication of the user based on the one or more identities.

2. The network device of claim 1, wherein the instructions further cause the network device to:
detect that the connection between the network device and the external network has been restored;
determine, in response to detecting that the connection has been restored, whether the status of the connection complies with an online authentication rule; and
communicate, in response to determining that the status of the connection complies with the online authentication rule, an indication of compliance with the online authentication rule to the local identity provider via the application program to initiate online authentication of the user.

3. The network device of claim 2, wherein the online authentication is based on federation to a centralized identity provider that is available via the external network.

4. The network device of claim 1, wherein the offline authentication rule is based on a duration of the interruption; and wherein the instructions that cause the network device to determine the status of the connection further cause the network device to determine the duration of the interruption.

5. The network device of claim 4, wherein the instructions that cause the network device to determine whether the status of the connection complies with the offline authentication rule further cause the network device to determine whether the duration of the interruption is less than a threshold duration defined by the offline authentication rule.

6. The network device of claim 1, wherein the offline authentication rule is based on a time of day of the interruption; and wherein the instructions that cause the network device to determine the status of the connection further cause the network device to determine the time of day of the interruption.

7. The network device of claim 6, wherein the instructions that cause the network device to whether the status of the connection complies with the offline authentication rule further cause the network device to determine whether the time of day of the interruption corresponds to a permitted offline period defined by the offline authentication rule.

8. The network device of claim 6, wherein the instructions that cause the network device to determine whether the status of the connection complies with the offline authentication rule further cause the network device to determine whether the time of day of the interruption corresponds to a predetermined pattern of offline activity for the user.

9. The network device of claim 1, wherein:
a subset of the one or more identities is associated with corresponding personal identification numbers (PINs); and
the offline authentication includes presenting a request for a PIN from the user.

10. The network device of claim 1, wherein the indication of compliance with the offline authentication rule is a Hypertext Transfer Protocol (HTTP) header.

11. A method for authentication comprising:
monitoring, by a network device, a connection between the network device and an external network, the network device being further connected to a local server on a local network and the local server including a local identity provider to which an application program running on the local network connects for authenticating a user;
determining, by the network device, a status of the connection between the network device and the external network;
detecting, by the network device, an interruption in the connection between the network device and the external network;
determining, by the network device in response to detecting the interruption, whether the status of the connection complies with an offline authentication rule; and
communicating, by the network device in response to determining that the status of the connection complies with the offline authentication rule, an indication of compliance with the offline authentication rule to the local identity provider on the local server via the application program to initiate offline authentication of the user based on one or more identities stored on the local network and accessible by the local identity provider.

12. The method of claim 11 and further comprising:
detecting, by the network device, that the connection between the network device and the external network has been restored;
determining, in response to detecting that the connection has been restored, whether the status of the connection complies with an online authentication rule; and
communicating, by the network device in response to determining that the status of the connection complies with the online authentication rule, an indication of compliance with the online authentication rule to the local identity provider via the application program to initiate online authentication of the user.

13. The method of claim 12, wherein the online authentication is based on federation to a centralized identity provider that is available via the external network.

14. The method of claim 11, wherein the offline authentication rule is based on a duration of the interruption; and wherein determining the status of the connection further includes determining the duration of the interruption.

15. The method of claim 14, wherein determining whether the status of the connection complies with the offline authentication rule further includes determining whether the duration of the interruption is less than a threshold duration defined by the offline authentication rule.

16. The method of claim 11, wherein the offline authentication rule is based on a time of day of the interruption; and wherein determining the status of the connection further includes determining the time of day of the interruption.

17. The method of claim 16, wherein determining whether the status of the connection complies with the offline authentication rule further includes determining whether the time of day of the interruption corresponds to a permitted offline period defined by the offline authentication rule.

18. The method of claim 16, wherein determining whether the status of the connection complies with the offline authentication rule further includes determining whether the time of day of the interruption corresponds to a predetermined pattern of offline activity for the user.

19. The method of claim 11, wherein:
a subset of the one or more identities is associated with corresponding personal identification numbers (PINs); and
the offline authentication includes presenting a request for a PIN from the user.

20. The method of claim 11, wherein the indication of compliance with the offline authentication rule is a Hypertext Transfer Protocol (HTTP) header.

* * * * *